(12) United States Patent
Sakai et al.

(10) Patent No.: US 6,729,446 B2
(45) Date of Patent: May 4, 2004

(54) SOLENOID-OPERATED DRIVING APPARATUS AND DAMPING FORCE CONTROL TYPE HYDRAULIC SHOCK ABSORBER USING THE SAME

(75) Inventors: Hiroshi Sakai, Tokyo (JP); Takashi Nezu, Tokyo (JP)

(73) Assignee: Tokico, Ltd., Kanagawa-ken (JP)

( * ) Notice: Subject to any disclaimer, the term of this patent is extended or adjusted under 35 U.S.C. 154(b) by 37 days.

(21) Appl. No.: 09/840,834

(22) Filed: Apr. 25, 2001

(65) Prior Publication Data

US 2001/0035317 A1 Nov. 1, 2001

(30) Foreign Application Priority Data

Apr. 28, 2000 (JP) ........................................ 2000-131318

(51) Int. Cl.[7] ................. F16F 9/49; B60T 8/36
(52) U.S. Cl. ................. 188/266.2; 188/280; 188/282.2; 188/282.4; 303/119.2; 303/119.1; 251/129.15
(58) Field of Search ........................... 188/266.2, 266.5, 188/267, 275, 280, 281, 282.1, 282.4, 282.5, 282.6, 282.8, 282.9, 283, 284, 322.13, 322.15, 322.17, 322.18; 303/119.1, 119.2, 117.1; 251/129.15, 129.2, 129.21

(56) References Cited

U.S. PATENT DOCUMENTS

| | | | | |
|---|---|---|---|---|
| 3,877,760 A | * | 4/1975 | Cole et al. ................. 303/21 F |
| 4,397,368 A | * | 8/1983 | Takeshima ................. 180/143 |
| 4,686,626 A | * | 8/1987 | Kuroki et al. ............... 364/426 |
| 4,696,379 A | * | 9/1987 | Yamamoto et al. ......... 188/299 |
| 4,706,787 A | * | 11/1987 | Wossner ..................... 188/299 |
| 4,854,429 A | * | 8/1989 | Casey ......................... 188/299 |
| 4,953,671 A | * | 9/1990 | Imaizumi .................... 188/299 |
| 5,129,489 A | * | 7/1992 | Majima et al. .............. 188/299 |
| 5,248,191 A | * | 9/1993 | Kondo et al. ............. 303/117.1 |
| 5,522,484 A | * | 6/1996 | Sawai ....................... 188/282.2 |
| 5,655,633 A | * | 8/1997 | Nakadate et al. ........... 188/299 |
| 5,690,195 A | * | 11/1997 | Kruckemeyer et al. ..... 188/299 |
| 5,781,873 A | * | 7/1998 | Sasaki .......................... 701/37 |
| 5,833,037 A | * | 11/1998 | Preukschat ............... 188/299.1 |
| 5,901,820 A | * | 5/1999 | Kashiwagi et al. ....... 188/266.6 |
| 5,934,421 A | * | 8/1999 | Nakadate et al. ......... 188/299.1 |
| 5,944,153 A | * | 8/1999 | Ichimaru .................. 188/299.1 |
| 5,950,775 A | * | 9/1999 | Achmad ................... 188/266.2 |
| 5,975,258 A | * | 11/1999 | Nezu et al. ............. 188/322.15 |
| 6,065,734 A | * | 5/2000 | Tackett et al. ......... 251/129.02 |
| 6,155,391 A | * | 12/2000 | Kashiwagi et al. ....... 188/266.6 |
| 6,371,262 B1 | * | 4/2002 | Katou et al. .............. 188/266.5 |
| 6,374,967 B2 | * | 4/2002 | Matsumoto et al. ..... 188/266.5 |

FOREIGN PATENT DOCUMENTS

| | | |
|---|---|---|
| DE | 38 00 288 | 6/1989 |
| DE | 4022098 C1 * | 7/1991 |
| DE | 195 00 904 | 7/1995 |
| DE | 100 60 898 | 7/2001 |
| DE | 100 59 474 | 8/2001 |
| GB | 2 231 122 | 11/1990 |
| JP | 62-23415 | 2/1987 |
| JP | 5-149364 | 6/1993 |
| JP | 5231462 A * | 9/1993 |
| JP | 1047413 A * | 2/1998 |

OTHER PUBLICATIONS

US 2001/0002639 A1 to Nezu.*

* cited by examiner

Primary Examiner—Jack Lavinder
Assistant Examiner—Melody M. Burch
(74) Attorney, Agent, or Firm—Wenderoth, Lind & Ponack L.L.P.

(57) ABSTRACT

A damping force control type hydraulic shock absorber includes a plunger having a small-diameter main body portion slidably guided by a first fixed core made of a magnetic material. The plunger has a large-diameter attracted portion at an end thereof closer to a second fixed core. The diameter (D2) of the attracted portion is set larger than the diameter (D1) of the main body portion (D2>D1), thereby increasing the area of the mutually opposing surfaces of the attracted portion and the second fixed core. Accordingly, attraction force acting on the attracted portion can be increased without reducing the magnetic flux density at the main body portion.

15 Claims, 3 Drawing Sheets

SOLENOID-OPERATED DRIVING APPARATUS AND DAMPING FORCE CONTROL TYPE HYDRAULIC SHOCK ABSORBER USING THE SAME

BACKGROUND OF THE INVENTION

The present invention relates to a solenoid-operated driving apparatus and a damping force control type hydraulic shock absorber attached to a suspension system of a vehicle such as an automobile and which uses a driving apparatus of the above-mentioned type.

Hydraulic shock absorbers attached to suspension systems of automobiles or other vehicles include damping force control type hydraulic shock absorbers that are designed so that the level of damping force can be properly controlled in accordance with the road surface conditions, vehicle running conditions, etc. with a view to improving ride quality and steering stability.

As shown in Japanese Patent Application Unexamined Publication (KOKAI) No. Hei 5-149364, by way of example, a conventional damping force control type hydraulic shock absorber includes a cylinder having a hydraulic fluid sealed therein. A piston is slidably fitted in the cylinder to divide the inside of the cylinder into two chambers. The piston is connected with a hollow piston rod to form a piston assembly. The piston assembly is provided with a main hydraulic fluid passage and a bypass passage, which provide communication between the two chambers in the cylinder. The main hydraulic fluid passage is provided with a damping force generating mechanism including an orifice and a disk valve. The bypass passage is provided with a damping force control valve for controlling the passage area of the bypass passage.

The damping force control valve is driven by the displacement of a plunger constituting a proportional solenoid driving device provided in the piston rod. When the damping force control valve is actuated to open the bypass passage, the flow resistance to the hydraulic fluid flowing between the two chambers in the cylinder decreases. Consequently, damping force is reduced. When the damping force control valve is operated to close the bypass passage, the flow resistance between the two chambers increases. Consequently, damping force is increased. Thus, damping force can be properly controlled by opening or closing the damping force control valve.

The proportional solenoid driving device used in the damping force control type hydraulic shock absorber disclosed in Publication No. Hei 5-149364 is arranged as follows. The plunger has a main body portion and a magnetically attracted portion smaller in diameter than the main body portion. The attracted portion is connected to the main body portion through a step formed approximately at right angles to the main body portion. The attracted portion is adapted to enter or withdraw from a tubular projection formed integrally with a fixed core. When a coil is energized, a magnetic path is formed in members made of a magnetic material, such as the fixed core and the plunger, thereby attracting the plunger to the fixed core.

The tubular projection of the fixed core is tapered. The plunger is attracted to the fixed core according to the magnitude of the electric current supplied to the coil, which is controlled through a controller. As the plunger approaches the fixed core, the magnetic flux is allowed to escape to the tapered projection in the radial direction, thereby allowing attraction force approximately proportional to the magnitude of the electric current to be obtained.

The above-described prior art suffers, however, from some problems. The attracted portion is formed smaller in diameter than the main body portion because the proportional solenoid driving device is provided in a small space in the piston rod and because the attracted portion of the plunger is caused to enter or withdraw from the tapered tubular projection formed on the fixed core. As shown by the "prior art" attraction force characteristic curve in FIG. 3, as the electric current supplied to the coil is gradually increased, in particular, magnetic saturation occurs at the small-diameter attracted portion and so forth, and attraction force becomes insufficient in the latter half of the control zone (i.e., at a position where the plunger has approached the fixed core). It should be noted that the magnitude of attraction force depends on the area of the mutually opposing surfaces of the attracted portion and the fixed core.

Accordingly, there is a plunger displacement region in which the damping force characteristics do not change linearly even if the electric current supplied to the coil is increased at a fixed rate. To solve this problem, it is conceivable to increase the electric current supplied to the coil from the controller only in this displacement region or to provide a spring or the like for assistively urging the plunger in the direction in which it is magnetically attracted. In the former case, however, the consumed current not only increases, but control also becomes complicated, and the load on the controller and the coil increases unfavorably. In the latter case, because a spring or the like for assistively urging the plunger is needed, costs increase correspondingly, and productivity is degraded correspondingly. Thus, these countermeasures involve various problems.

SUMMARY OF THE INVENTION

The present invention was made in view of the above-described problems associated with the prior art.

An object of the present invention is to provide a damping force control type hydraulic shock absorber capable of increasing the magnetic force for attracting the plunger in a limited small space with a solenoid-operated driving device having a simplified structure.

The present invention provides a damping force control type hydraulic shock absorber including a cylinder having a hydraulic fluid sealed therein. A piston is slidably provided in the cylinder to divide the inside of the cylinder into an upper chamber and a lower chamber. A hydraulic fluid passage is formed to provide communication between the upper chamber and the lower chamber. A damping force control mechanism is provided in the hydraulic fluid passage to control damping force by controlling the flow of the hydraulic fluid induced in the hydraulic fluid passage by sliding movement of the piston. A solenoid-operated driving device for driving the damping force control mechanism is accommodated in a casing. The solenoid-operated driving device includes a coil provided in the casing. A tubular member is provided in the coil at one end of the coil to form a magnetic path when the coil is energized. A plunger is slidably guided in the tubular member. An attracting member is provided in the coil at the other end of the coil to form a magnetic path when the coil is energized so as to attract the plunger. The plunger has a small-diameter main body portion slidably guided in the tubular member and a large-diameter attracted portion having a surface facing the attracting member. The large-diameter attracted portion is located between the main body portion and the attracting member. The attracting member has a tubular projection provided on a surface thereof that faces the attracted portion of the plunger so that the attracted portion enters or withdraws from the tubular projection.

Thus, according to the present invention, the main body portion of the plunger is reduced in diameter, and the small-diameter main body portion is slidably guided by the tubular member that forms a magnetic path. Therefore, the magnetic flux density can be increased satisfactorily. In addition, because the attracted portion is made larger in diameter than the main body portion, it is possible to increase the area of the mutually opposing surfaces of the attracted portion and the attracting member that forms a magnetic path. As a result, it is possible to increase the magnetic force for attracting the plunger. In addition, a tubular projection is provided on the surface of the attracting member that faces the attracted portion of the plunger so that the attracted portion enters or withdraws from the tubular projection. Therefore, the tubular projection radially absorbs the magnetic flux from the plunger. Accordingly, it is possible to obtain attraction force proportional to the magnitude of the electric current supplied to the coil. Hence, it is possible to reliably change damping force characteristics in proportion to the magnitude of the electric current supplied to the coil.

Preferably, the plunger in the above-described damping force control type hydraulic shock absorber is inversely tapered so as to gradually increase in diameter from the main body portion toward the attracted portion.

With this arrangement, it is possible to smoothen the flow of magnetic flux between the main body portion and the attracted portion of the plunger and to spread the magnetic flux surely as far as the outermost periphery of the attracted portion. Accordingly, attraction force can be further increased, and the consumed current can be reduced. Consequently, it is possible to suppress the generation of heat from the coil and so forth and to change damping force characteristics stably.

According to one aspect of the invention, the damping force control type hydraulic shock absorber further includes a first bearing situated in the tubular member so that the plunger is slidably guided by the first bearing and a second bearing situated in the attracting member. The solenoid-operated driving mechanism includes an actuating rod having opposite end portions. One end portion of the actuating rod is connected to an end portion of the plunger on the side of the attracting member and the other end portion of the actuating rod extends through the attracting member and is slidably guided by the second bearing.

With this arrangement, the opposing surfaces of the attracted portion of the plunger and the attracting member are positioned between the first and second bearings. Therefore, it is possible to stabilize the radial position in which the plunger engages with the attracting member when the former is attracted by the latter.

According to another aspect of the invention, the tubular member has a bottom wall so that a space filled with a hydraulic fluid is defined by the tubular member and the plunger between the bottom and the plunger and wherein the plunger has an orifice passage axially extending through the plunger and having an orifice.

With this arrangement, abrupt movement of the plunger upon energizing the coil is damped.

The present invention a so provides a solenoid-operated driving apparatus comprising a coil provided in a casing, a tubular member provided in the coil at one end portion of the coil to form a portion of a magnetic path for the magnetic flux created when the coil is energized, a plunger slidably guided in the tubular member, and an attracting member provided in the coil at the other end portion of the coil to form another portion of the magnetic path when the coil is energized so as to attract the plunger. The plunger has a small-diameter main body portion slidably guided in the tubular member and a large-diameter attracted portion having a surface facing the attracting member. The large-diameter attracted portion is located between the main body portion and the attracting member. The attracting member has a tubular projection provided on a surface thereof that faces the attracted portion of the plunger so that the attracted portion enters or withdraws from the tubular projection.

Thus, also in the arrangement stated just above, the main body portion of the plunger is reduced in diameter, and the small-diameter main body portion is slidably guided by the tubular member that forms a magnetic path. Therefore, the magnetic flux density can be increased satisfactorily. In addition, because the attracted portion is made larger in diameter than the main body portion, it is possible to increase the area of the mutually opposing surfaces of the attracted portion and the attracting member that forms a magnetic path. As a result, it is possible to increase the magnetic force for attracting the plunger. In addition, a tubular projection is provided on the surface of the attracting member that faces the attracted portion of the plunger so that the attracted portion enters or withdraws from the tubular projection. Therefore, the tubular projection radially absorbs the magnetic flux from the plunger. Accordingly, it is possible to obtain attraction force proportional to the magnitude of the electric current supplied to the coil and hence possible to reliably change damping force characteristics in proportion to the magnitude of the electric current supplied to the coil.

The above and other objects, features and advantages of the present invention will become more apparent from the following description of the preferred embodiments thereof, taken in conjunction with the accompanying drawings.

DETAILED DESCRIPTION OF THE INVENTION

An embodiment of the present invention will be described below in detail with reference to FIGS. 1 to 3.

Figure 1:
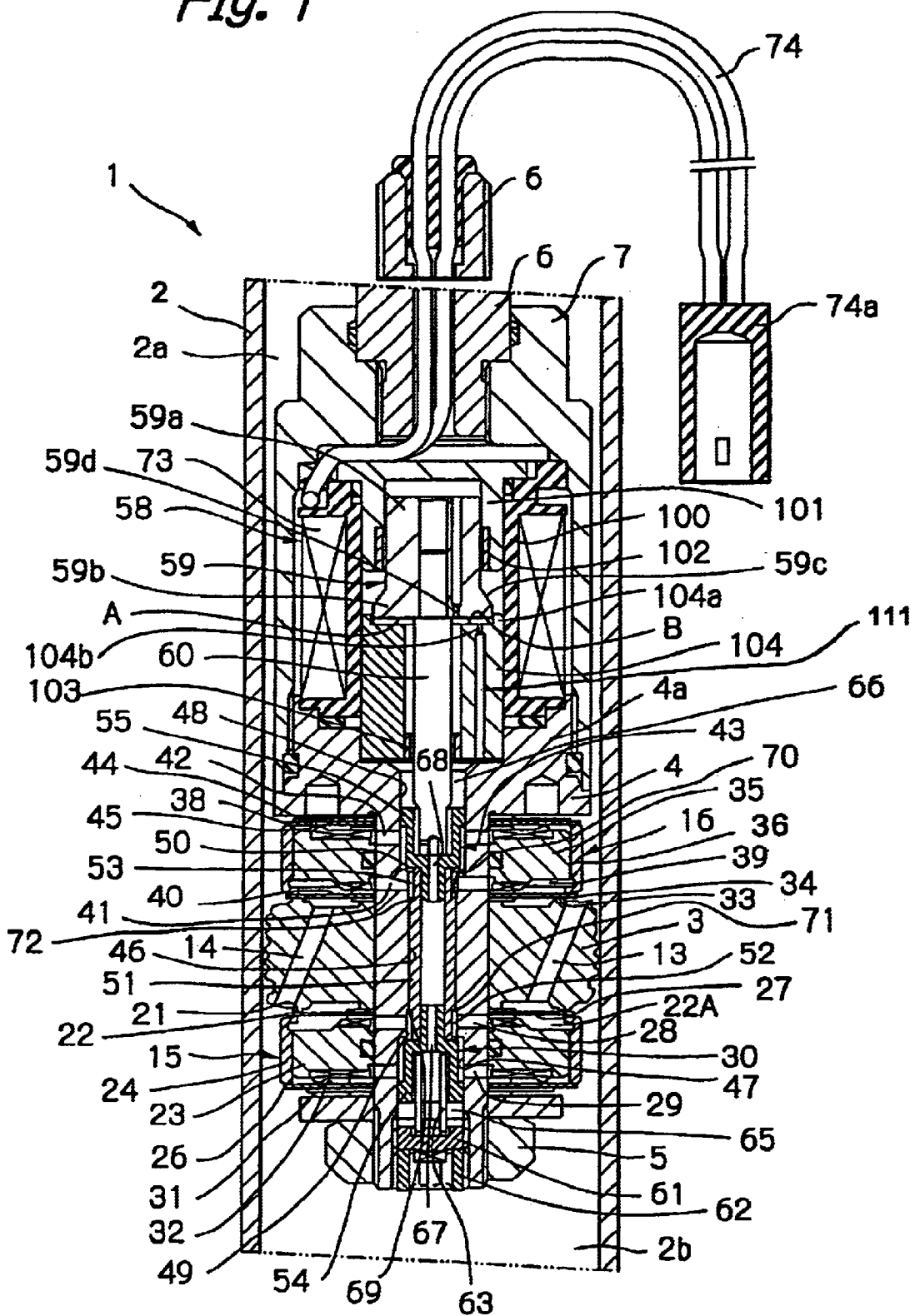
FIG. 1 is an enlarged vertical sectional view showing the piston part of a damping force control type hydraulic shock absorber according to an embodiment of the present invention.
Figure 2:
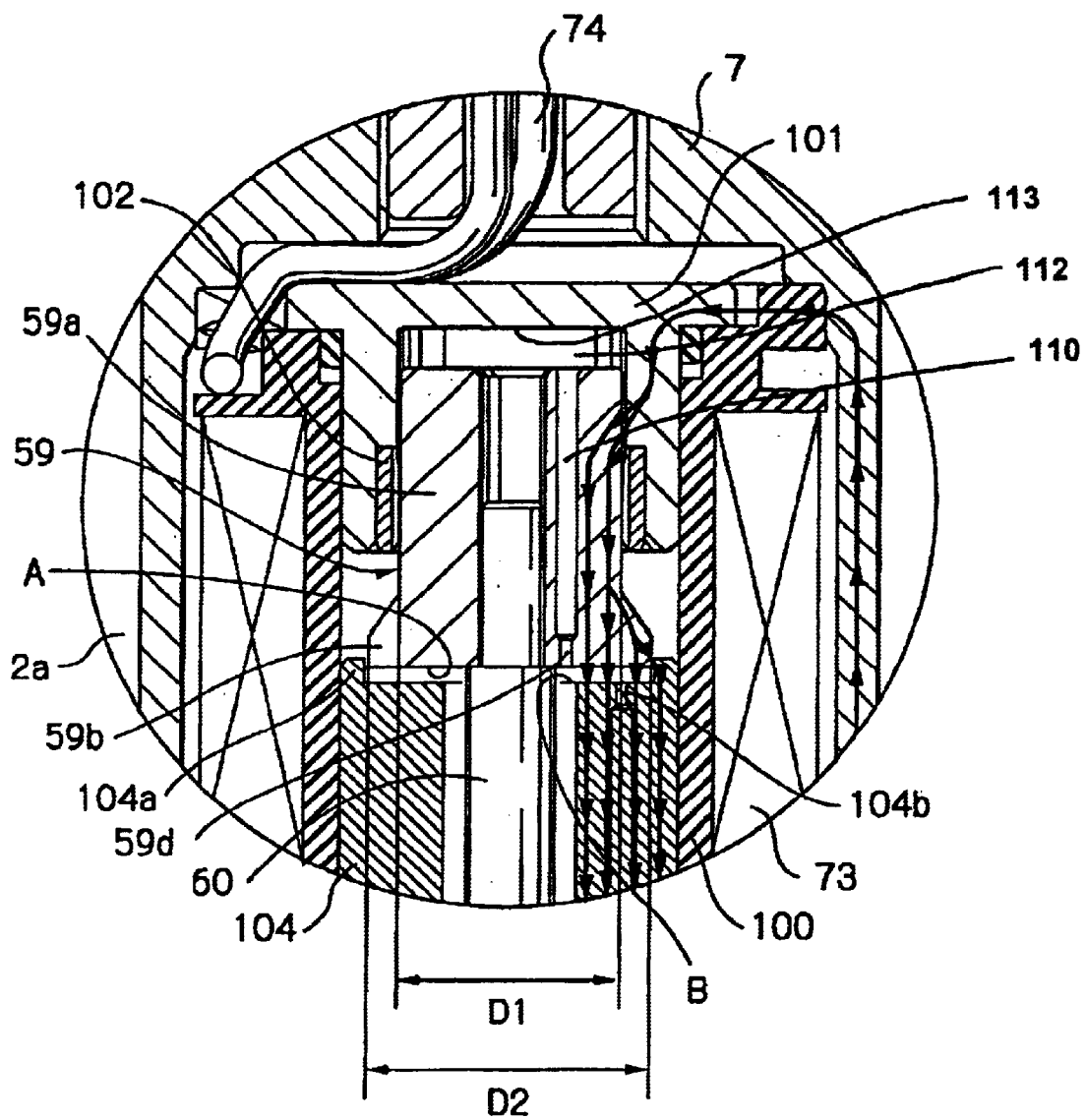
FIG. 2 is an enlarged vertical sectional view showing an essential part of FIG. 1.

As shown in FIGS. 1 and 2, a damping force control type hydraulic shock absorber 1 according to the present invention has a double-cylinder structure comprising a cylinder 2 and an outer cylinder (not shown) provided outside the cylinder 2. A reservoir (not shown) is formed between the cylinder 2 and the outer cylinder. The cylinder 2 has hydraulic fluid sealed therein, and the reservoir also has the hydraulic fluid sealed therein, together with a gas sealed under a predetermined pressure. A piston 3 is slidably fitted in the cylinder 2. The piston 3 divides the inside of the cylinder 2 into two chambers, i.e., a cylinder upper chamber 2*a* and a cylinder lower chamber 2*b*. An approximately cylindrical piston bolt 4 is inserted into the piston 3, and the piston 3 is secured to the piston bolt 4 by using a nut 5. The piston bolt 4 has a large-diameter portion 4a at the proximal end thereof. A solenoid casing 7 secured to one end portion of a piston rod 6 is screwed onto the large-diameter portion 4a of the piston bolt 4. The other end portion of the piston rod 6 extends through the cylinder upper chamber 2a and further through a rod guide (not shown) and an oil seal (not shown), which are fitted to the upper end portion of the double-cylinder structure comprising the cylinder 2 and the outer cylinder, and projects to the outside of the cylinder 2. A base valve (not shown) is provided in the lower end portion of the cylinder 2 to divide the cylinder lower chamber 2b and the reservoir from each other.

The piston 3 is provided with an extension hydraulic fluid passage 13 and a compression hydraulic fluid passage 14 for allowing communication between the cylinder upper and lower chambers 2a and 2b. An extension damping force generating mechanism 15 is provided between the piston 3 and the nut 5 to control the flow of the hydraulic fluid in the extension hydraulic fluid passage 13. A compression damping force generating mechanism 16 is provided between the piston 3 and the large-diameter portion 4a of the piston bolt 4 to control the flow of the hydraulic fluid in the compression hydraulic fluid passage 14. The base valve is provided with a hydraulic fluid passage (not shown) for communication between the cylinder lower chamber 2b and the reservoir. The hydraulic fluid passage is provided with a check valve (not shown) that allows the hydraulic fluid to flow through the hydraulic fluid passage in only one direction from the reservoir toward the cylinder lower chamber 2b. The hydraulic fluid passage is further provided with a disk valve (not shown) that opens when the pressure of the hydraulic fluid in the cylinder lower chamber 2b reaches a predetermined pressure to allow the hydraulic fluid to flow toward the reservoir.

The extension damping force generating mechanism 15 will be described below. This damping force generating mechanism is a pilot operated type of damping valve. An annular valve seat 21 projects from an end surface of the piston 3 that faces the cylinder lower chamber 2b. A main disk valve 22 (pilot-type damping valve) is seated on the valve seat 21. An annular fixed member 23 is mounted on the piston bolt 4 between the piston 3 and the nut 5. A movable ring 24 is slidably fitted on the outer periphery of the fixed member 23. The movable ring 24 is pressed to abut against the main disk valve 22 by spring force of a disk-shaped plate spring 26 clamped between the fixed member 23 and the nut 5. A back-pressure chamber 22A is formed between the main disk valve 22 and the fixed member 23 so that the pressure in the back-pressure chamber 22A acts on the main disk valve 22 in the direction which closes it. The back-pressure chamber 22A communicates with the extension hydraulic fluid passage 13 through a fixed orifice 27 provided in the main disk valve 22. The back-pressure chamber 22A also communicates with the other side of the fixed member 23 through hydraulic fluid passages 28 and 29 provided in the side wall of the piston bolt 4 through an extension pressure control valve 30 provided inside the piston bolt 4. The passage 28 is an extension side upstream port and the passage 29 an extension side downstream port with respect to the extension pressure control valve 30. The back-pressure chamber 22A further communicates with the cylinder lower chamber 2b through a hydraulic fluid passage 32 provided in the plate spring 26 and further through a check valve 31 (disk valve) stacked on the plate spring 26.

The compression damping force generating mechanism 16 will be described below. This damping force generating mechanism is also a pilot operated type damping valve. An annular valve seat 33 projects from an end surface of the piston 3 that faces the cylinder upper chamber 2a. A main disk valve 34 (pilot type damping valve) is seated on the valve seat 33. An annular fixed member 35 is mounted on the piston bolt 4 between the large-diameter portion 4a and the piston 3. A movable ring 36 is slidably fitted on the outer periphery of the fixed member 35. The movable ring 36 is pressed to abut on the main disk valve 34 by spring force of a disk-shaped plate spring 38 clamped between the fixed member 35 and the large-diameter portion 4a. A back-pressure chamber 39 is formed between the main disk valve 34 and the fixed member 35 so that the pressure in the back-pressure chamber 39 acts on the main disk valve 34 in the direction for closing it. The back-pressure chamber 39 communicates with the compression hydraulic fluid passage 14 through a fixed orifice 40 provided in the main disk valve 34. The back-pressure chamber 39 also communicates with the other side of the fixed member 35 by hydraulic fluid passages 41 and 42 provided in the side wall of the piston bolt 4 through a compression pressure control valve 43 provided inside the piston bolt 4. The passage 41 is a compression side upstream port and the passage 42 a compression side downstream port with respect to the compression pressure control valve 43. The back-pressure chamber 39 further communicates with the cylinder upper chamber 2a through a hydraulic fluid passage 45 provided in the plate spring 38 and further through a check valve 44 (disk valve) stacked on the plate spring 38.

The extension and compression pressure control valves 30 and 43 (damping force control mechanisms) will be described below. The piston bolt 4 has a small-diameter bore 46 formed in a central portion thereof. The hydraulic fluid passages 28 and 41 open into the small-diameter bore 46. The piston bolt 4 further has large-diameter bores 47 and 48 formed at both sides of the small-diameter bore 46. The hydraulic fluid passages 29 and 42 open into the large-diameter bores 47 and 48, respectively. Steps defined between the small-diameter bore 46 and the large-diameter bores 47 and 48 form annular valve seats 49 and 50, respectively. A cylindrical slider 51 is slidably fitted in the small-diameter bore 46 of the piston bolt 4. Annular valve chambers 52 and 53 are formed between the small-diameter bore 46 and small-diameter portions formed at both ends of the slider 51. The annular valve chambers 52 and 53 communicate with the hydraulic fluid passages 28 and 41, respectively. Sub-valve members 54 and 55 are press-fitted into both end portions of the slider 51. The sub-valve member 54 is an extension side valve member and the sub-valve 55 a compression side valve member. The sub-valve members 54 and 55 are adapted to rest on or separate from the valve seats 49 and 50, respectively.

A proportional solenoid 58 (solenoid-operated driving device) is provided in the solenoid casing 7. The proportional solenoid 58 has a bobbin 100 made of a resin material with an approximately U-shaped sectional configuration. The bobbin 100 is wound with a coil 73.

A first fixed core 101 (tubular member) of a magnetic material is provided in the coil 73 to extend from the upper end to an approximately middle portion of the coil 73 in the axial direction and fixed in this position. The first fixed core 101 slidably guides a small-diameter main body portion 59a of a plunger 59 immersed in the hydraulic fluid through a bearing 102 (first bearing) made of a fluoro-plastic material. As shown in FIG. 2, at least a portion of the small-diameter portion 59a of plunger 59 is arranged within tubular member 101 so that a hydraulic fluid space 112 is formed between the bottom wall 113 of the tubular member 101 and the plunger 59 (specifically, the top of the plunger 59).

An actuating rod 60 is secured to the plunger 59 by press fitting. The actuating rod 60 is slidably guided by a second fixed core 104 (attracting member) through a bearing 103 (second bearing) made of a fluoro-plastic material. The lower end of the second fixed core 104 is secured to the large-diameter portion 4a of the piston bolt 4. The upper end of the second fixed core 104 extends into the coil 73 as far as an approximately middle portion of the coil 73 in the axial direction and is fixed in this position. The second fixed core 104 has a tubular projection 104a at the upper end thereof so that a large-diameter attracted portion 59b (i.e., a portion having a larger diameter than the main body portion 59a) of the plunger 59 can enter or withdraw from the tubular projection 104a. The second fixed core 104 has an upper end surface B that faces a lower end surface A of the attracted portion 59b. The upper end surface B of the second fixed core 104 is inserted into the coil 73 as far as an approximately middle portion of the coil 73 in the axial direction. Accordingly, the magnetic flux density at the upper end surface B can be increased satisfactorily. Thus, a large attraction force can be generated throughout the stroke of the plunger 59. Furthermore, with the arrangement in which an end of the actuating rod 60 is press-fit in the plunger 59, the small-diameter main body portion 59a of the plunger 59 is slidably guided by the bearing 102, and the other end of the actuating rod 60 is guided by the bearing 103, it is possible to stabilize the radial position in which the plunger engages with the second fixed core 104 when the plunger is attracted by the second fixed core.

The tubular projection 104a formed on the second fixed core 104 radially receives the magnetic flux from the plunger 59, thereby making it possible to obtain attraction force approximately proportional to the magnitude of the electric current supplied to the coil 73.

It should be noted that the tubular projection 104a may be modified to conform to the characteristics of a product to which the present invention is applied. That is, the tubular projection 104a may be an annular projection continuously extending over the whole circumference or a combination of partial projections provided at a plurality (e.g. three or four) of positions in the circumferential direction. Alternatively, the tubular projection 104a may be a partially cutaway annular projection that extends continuously substantially over the whole circumference.

The attracted portion 59b of the plunger 59 is inversely tapered so as to gradually increase in diameter from the main body portion 59a (i.e. the diameter D2 of the attracted portion 59b is greater than the diameter D1 of the main body portion 59a). Thus, the attracted portion 59b has an annular tapered surface 59c. In other words, the transverse sectional area of the attracted portion 59b is larger than that of the main body portion 59a.

Although the attracted portion 59b and the main body portion 59a of the plunger are shown to have generally circular shapes, the invention is not limited to these particular shapes. They may have polygonal cross sections so long as the cross sectional area of the attracted portion 59b is larger than that of the main body portion 59a.

The plunger 59 and the second fixed core 104 are provided with respective damping orifices 59d and 104b (in fluid passages) for damping rapid movement of the plunger 59 when the coil 73 is energized. Specifically, the plunger 59 has an axially-extending fluid passage 110 formed therethrough, and the damping orifice 59d (i.e., a portion of the passage having a smaller inside diameter than any other portion of the passage) is formed in fluid passage 110, as shown in FIG 2. In addition, fluid passage 111 is formed through second fixed core 104, and damping orifice 104b is formed in fluid passage 111, as shown in FIG. 1.

Lead wires 74 are connected to the coil 73. The lead wires 74 extend through the upper end of the bobbin 100 and further extends through the hollow portion of the piston rod 6 to the outside of the cylinder 2. A connector 74a is connected to the lead wires 74. The connector 74a is connected to a controller (not shown).

The distal end of the actuating rod 60 abuts against the sub-valve member 55 secured to one end of the slider 51. An adjusting plug 61 and a lock nut 62 are screwed into the opening at the distal end of the large-diameter bore 47 of the piston bolt 4 to close the opening. A compression spring 63 is interposed between the adjusting plug 61 and the sub-valve member 54 secured to the other end of the slider 51. The sub-valve members 54 and 55 are provided with hydraulic fluid passages 67 and 68 for providing communication between hydraulic fluid chambers 65 and 66 formed at both sides of the slider 51 to keep a balance between the pressures of the hydraulic fluid acting on the two ends of the slider 51.

The small-diameter bore 46 of the piston bolt 4 is provided with steps 69 and 70 at respective positions in the hydraulic fluid chambers 52 and 53. In the hydraulic fluid chambers 52 and 53, the pressure-receiving area of the sub-valve members 54 and 55 (i.e. the pressure-receiving area for causing the slider 51 to generate thrust in the valve opening direction) is larger than the pressure-receiving area of steps 71 and 72 of the slider 51 (i.e. the pressure-receiving area for causing the slider 51 to generate thrust in the valve closing direction).

When the coil 73 is not energized, the slider 51 is urged by the compression spring 63 so that the sub-valve member 54 rests on the valve seat 49, whereas the sub-valve member 55 is held at a position where it is separate from the valve seat 50. When the coil 73 is energized, the proportional solenoid 58 causes the plunger 59 to move downward in the figures against the compression spring 63 with attraction force corresponding to the magnitude of the electric current supplied to the coil 73, thereby selectively urging the sub-valve member 54 in the valve opening direction and the sub-valve member 55 in the valve closing direction.

It should be noted that setting of the initial load of the compression spring 63 can be adjusted with the adjusting plug 61 and the lock nut 62.

The following is a description of the operation of the embodiment arranged as stated above.

During the extension stroke of the piston rod 6, as the piston 3 moves, the hydraulic fluid in the cylinder upper chamber 2a is pressurized. Consequently, before the main disk valve 22 of the extension damping force generating mechanism 15 opens (in a low piston speed region), the hydraulic fluid in the cylinder upper chamber 2a flows to the cylinder lower chamber 2b through the extension hydraulic fluid passage 13, the fixed orifice 27 in the main disk valve 22, the back-pressure chamber 22A, the hydraulic fluid passage 28, the extension pressure control valve 30, the hydraulic fluid passage 29, the hydraulic fluid passage 32 and the check valve 31. When the pressure in the cylinder upper chamber 2a reaches the valve opening pressure of the main disk valve 22 (i.e., a high piston speed operational region), the main disk valve 22 opens to allow the hydraulic fluid in the cylinder upper chamber 2a to flow directly into the cylinder lower chamber 2b through the extension hydraulic fluid passage 13. Meanwhile, an amount of hydraulic fluid corresponding to an amount by which the piston rod 6 withdraws from the cylinder 2 flows from the reservoir to the cylinder lower chamber 2b while opening the check valve in the hydraulic fluid passage of the base valve.

Thus, before the main disk valve 22 opens (i.e., in the low piston speed operation region), damping force is generated by the fixed orifice 27 and the extension pressure control valve 30. In the extension pressure control valve 30, because the pressure receiving area of the sub-valve member 54 is larger than the pressure receiving area of the step 71 of the slider 51 in the hydraulic fluid chamber 52, the difference between the axially facing pressure receiving areas causes thrust to be induced in the slider 51 in the direction for opening the sub-valve member 54. Meanwhile, the compression spring 63 urges the slider 51 in the direction for closing the sub-valve member 54. The valve opening pressure of the sub-valve member 54 can be controlled according to the electric current supplied to the coil 73. Thus, before the main disk valve 22 opens (i.e., in the low piston speed operational region), damping force can be directly controlled independently of the piston speed.

Further, as the valve opening pressure of the sub-valve member 54 is controlled, the pressure in the back-pressure chamber 22A, which is on the upstream side of the sub-valve member 54, is controlled according to the valve opening pressure. The pressure in the back-pressure chamber 22A acts on the main disk valve 22 in the direction for closing it as a pilot pressure. Therefore, the valve opening pressure of the main disk valve 22 can also be controlled at the same time as the valve opening pressure of the sub-valve member 54 is controlled. Thus, damping force in the high piston speed region can be controlled simultaneously.

During the compression stroke of the piston rod 6, as the piston 3 moves, the check valve of the base valve is closed. Consequently, the hydraulic fluid in the cylinder lower chamber 2b is pressurized. Before the main disk valve 34 of the compression damping force generating mechanism 16 opens (i.e., in a low piston speed operational region), the hydraulic fluid in the cylinder lower chamber 2b flows to the cylinder upper chamber 2a through the compression hydraulic fluid passage 14, the fixed orifice 40 in the main disk valve 34, the back-pressure chamber 39, the hydraulic fluid passage 41, the compression pressure control valve 43, the hydraulic fluid passage 42, the hydraulic fluid passage 45 and the check valve 44. When the pressure in the cylinder lower chamber 2b reaches the valve opening pressure of the main disk valve 34 (i.e., a high piston speed operational region), the main disk valve 34 opens to allow the hydraulic fluid in the cylinder lower chamber 2b to flow directly into the cylinder upper chamber 2a through the compression hydraulic fluid passage 14. Meanwhile, an amount of hydraulic fluid corresponding to an amount by which the piston rod 6 enters the cylinder 2 flows from the cylinder lower chamber 2b to the reservoir while opening the disk valve in the hydraulic fluid passage of the base valve.

Thus, before the main disk valve 34 opens (i.e., in the low piston speed operational region), damping force is generated by the fixed orifice 40 and the compression pressure control valve 43. In the compression pressure control valve 43, because the pressure receiving area of the sub-valve member 55 is larger than the pressure receiving area of the step 72 of the slider 51 in the hydraulic fluid chamber 53, the difference between the pressure receiving areas causes thrust to be induced in the slider 51 in the direction for opening the sub-valve member 55. Meanwhile, the slider 51 is urged in the direction for closing the sub-valve member 55 by the proportional solenoid 58, and the valve opening pressure of the sub-valve member 55 is controlled according to the electric current supplied to the coil 73. Thus, before the main disk valve 34 opens (i.e., in the low piston speed operational region), damping force can be directly controlled independently of the piston speed.

Further, as the valve opening pressure of the sub-valve member 55 is controlled, the pressure in the back-pressure chamber 39, which is on the upstream side of the sub-valve member 55, is controlled according to the valve opening pressure. The pressure in the back-pressure chamber 39 acts on the main disk valve 34 in the direction for closing it as a pilot pressure. Therefore, the valve opening pressure of the main disk valve 34 can also be controlled at the same time as the valve opening pressure of the sub-valve member 55 is controlled. Thus, damping force in the high piston speed region can be controlled simultaneously.

In this way, damping force can be controlled over a piston speed range from the low speed region to the high speed region, and thus the damping force control range can be widened. Because appropriate damping force based on the valve characteristics can be obtained even in the low piston speed region by the extension and compression pressure control valves 30 and 43, it is possible to prevent damping force from becoming insufficient in the low piston speed region and also prevent damping force from excessively increasing in the high piston speed region. In addition, the sub-valve members 54 and 55 provide a large opening area with respect to the amount of lift in comparison to conventional poppet valves and the like. Therefore, the amount of movement required for the slider 51 can be minimized (about 0.5 millimeters in general). Accordingly, superior responsivity is obtained.

In the present invention, damping force is controlled by the balance between thrust induced in the slider 51 owing to the pressure receiving area difference between the step 71 (72) and the sub-valve member 54 (55) in the hydraulic fluid chamber 52 (53) and thrust from the proportional solenoid 58. Therefore, reducing the pressure receiving area difference makes it possible to reduce the load on the proportional solenoid 58 and to achieve a reduction in size and weight.

According to the electric current supplied to the coil 73 of the proportional solenoid 58, the slider 51 can be placed in either of two positions, i.e. a position where both the sub-valve members 54 and 55 are open ("soft" damping force characteristics during both the extension and compression strokes of the piston rod 6); and a position where either one of the sub-valve members 54 and 55 is closed, and the other is open ("soft" damping force characteristics during the extension stroke and "hard" damping force characteristics during the compression stroke, or vice versa). Thus, it is possible to obtain extension/compression inverting damping force characteristics suitable for semi-active suspension control based on the sky-hook damper theory.

The plunger 59 has the main body portion 59a reduced in diameter, and the main body portion 59a is slidably guided by the first fixed core 101 made of a magnetic material. In addition, the diameter (D2) of the attracted portion 59b of the plunger 59, which is formed at an end thereof closer to the second fixed core 104, is set larger than the diameter (D1) of the main body portion 59a (D2>D1), thereby increasing the area of the lower end surface A of the attracted portion 59b and the area of the upper end surface B of the second fixed core 104. Accordingly, attraction force acting on the attracted portion 59b can be increased without reducing the magnetic flux density at the main body portion 59a. Therefore, as shown by the "present invention" attraction force characteristic curve in FIG. 3, it is unlikely that magnetic saturation will occur even when the electric current supplied to the coil is gradually increased in comparison to a plunger structure in which the attracted portion is smaller in diameter than the main body portion as stated above in connection with the related art. Thus, attraction force can be increased effectively in the latter half of the control zone (i.e. at a position where the plunger 59 has approached the second fixed core 104).

The tapered surface 59c provided between the main body portion 59a and the attracted portion 59b of the plunger 59 serves to form a magnetic path along the annular tapered surface 59c and to allow the magnetic flux to extend smoothly as far as the outermost periphery of the attracted portion 59b, thereby allowing intensified attraction force to be obtained (i.e. an increase in attraction force). The tapered surface 59c also serves to prevent the plunger 59 from being attracted to the first fixed core 101 in the opposite direction (upward in the figures) to the normal attraction direction.

In a case where the main body portion 59a and the attracted portion 59b are connected through a step formed approximately at right angles to the main body portion 59a without providing the tapered surface 59c, for example, it is difficult for the magnetic flux to extend as far as the outermost periphery of the attracted portion 59b, which has an increased diameter. Consequently, attraction force weakens (i.e. attraction force is weaker than in the case of an attracted portion with a tapered surface even if the diameters of the two attracted portions are the same). In addition, it becomes likely that the magnetic flux will escape toward the first fixed core 101. Consequently, the plunger 59 is likely to be attracted in the opposite direction to the normal attraction direction.

Accordingly, in the foregoing embodiment, the stepped plunger 59 is structured so that the tapered surface 59c is provided between the main body portion 59a and the attracted portion 59b, thereby further increasing attraction force.

Further, if the lower end surface of the plunger and the upper end surface of the second fixed core that faces the lower end surface are merely increased in area, the attraction force of the plunger can be increased. However, because the attraction force increases quadratically, as the plunger approaches the second fixed core, the attraction force increases rapidly, unfavorably. In the foregoing embodiment, the tubular projection 104a is provided on the second fixed core 104 so that the attracted portion 59b of the plunger 59 enters or withdraws from the tubular projection 104a. Therefore, when the plunger 59 approaches the second fixed core 104, the tubular projection 104a of the second fixed core 104 radially absorbs the magnetic flux from the plunger 59 as shown by the arrows in FIG. 2. Accordingly, it is possible to obtain attraction force proportional to the magnitude of the electric current supplied to the coil 73 and hence possible to reliably change damping force characteristics in proportion to the magnitude of the supplied electric current.

Figure 3:
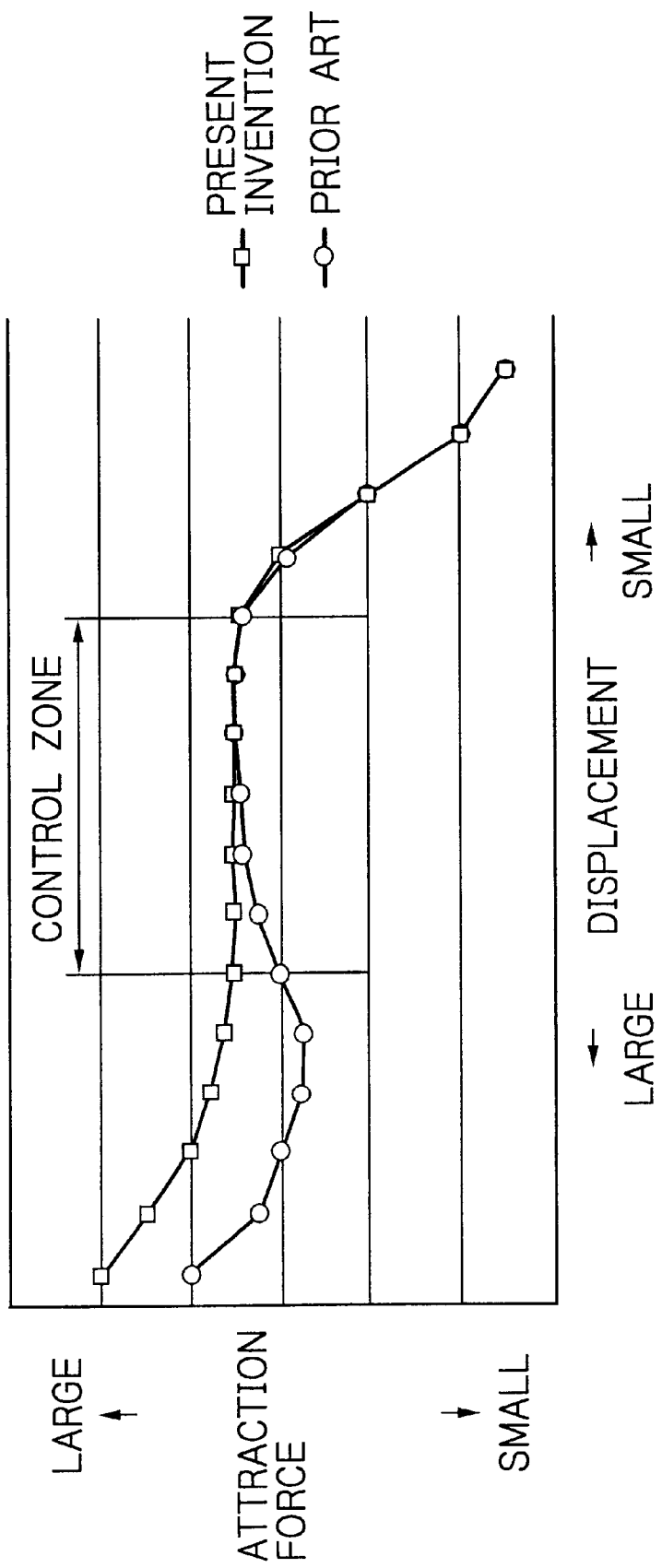
FIG. 3 is a characteristic chart showing attraction force characteristic curves for comparison between the prior art and an embodiment of the present invention

Thus, because the plunger 59 is formed in the shape having an enlarged end portion to increase attraction force, as shown in FIG. 3, attraction force of the same magnitude can be stably obtained in approximately the entire control zone of the plunger displacement. Accordingly, it is possible to reliably change damping force characteristics in proportion to the electric current supplied to the coil 73. In addition, because the plunger can be smoothly moved with a reduced power consumption, the load on the controller and the coil can be reduced, and the generation of heat can be minimized. Thus, stable damping force control can be performed at all times. Further, because it is unnecessary to provide a spring for assistively urging the plunger in the direction in which it is magnetically attracted, the structure can be simplified, and hence it is possible to reduce costs and to improve productivity.

Although the damping force control type hydraulic shock absorber shown in the foregoing embodiment is of the type in which a solenoid-operated driving device and so forth are incorporated in a piston assembly comprising a piston and a piston rod, it should be noted that the present invention is not necessarily limited to the described embodiment. The present invention is also applicable to a damping force control type hydraulic shock absorber in which upper and lower chambers defined in a cylinder by a piston communicate with each other by a bypass passage provided outside the cylinder and a solenoid-operated driving device and so forth are provided in the bypass passage.

Furthermore, although the solenoid-operated driving apparatus shown in the foregoing embodiment is used in a damping force control type hydraulic shock absorber, it should be noted that the present invention is not limited to the described embodiment. The solenoid-operated driving apparatus can also be used for control of braking systems of automobiles or control of other appliances.

As has been detailed above, the damping force control type hydraulic shock absorber according to the present invention includes a plunger having a small-diameter main body portion slidably guided in the tubular member and a large-diameter attracted portion having a surface facing an attracting member. The attracting member has a tubular projection provided on a surface thereof that faces the attracted portion of the plunger so that the attracted portion enters or withdraws from the tubular projection. Thus, according to the present invention, the main body portion of the plunger is reduced in diameter, and the small-diameter main body portion is slidably guided by the tubular member that forms a magnetic path. Therefore, the magnetic flux density can be increased satisfactorily. In addition, because the attracted portion is made larger in diameter than the main body portion, it is possible to increase the area of the mutually opposing surfaces of the attracted portion and the attracting member that forms a magnetic path. As a result, it is possible to increase the magnetic force for attracting the plunger. In addition, a tubular projection is provided on the surface of the attracting member that faces the attracted portion of the plunger so that the attracted portion enters or withdraws from the tubular projection. Therefore, the tubular projection radially absorbs the magnetic flux from the plunger. Accordingly, it is possible to obtain attraction force proportional to the magnitude of the electric current supplied to the coil and hence possible to reliably change damping force characteristics in proportion to the magnitude of the electric current supplied to the coil.

In one embodiment of the present invention, the plunger in the above-described damping force control type hydraulic shock absorber is inversely tapered so as to gradually increase in diameter from the main body portion toward the attracted portion. With this arrangement, it is possible to smoothen the flow of magnetic flux between the main body portion and the attracted portion of the plunger and to spread the magnetic flux surely as far as the outermost periphery of the attracted portion. Accordingly, attraction force can be further increased, and hence the consumed current can be reduced. Consequently, it is possible to suppress the generation of heat from the coil and so forth and to change damping force characteristics stably.

It should be noted that the present invention is not necessarily limited to the foregoing embodiments but can be modified in a variety of ways without departing from the gist of the present invention.

What is claimed is:

1. A damping force control type hydraulic shock absorber comprising:
    a cylinder having a hydraulic fluid sealed therein;
    a piston slidably provided in said cylinder to divide an inside of said cylinder into an upper chamber and a lower chamber;
    a piston rod connected to said piston;
    a hydraulic fluid passage for providing communication between said upper chamber and said lower chamber;
    a damping force control mechanism provided in said hydraulic fluid passage to control damping force by controlling flow of the hydraulic fluid induced in said hydraulic fluid passage by sliding movement of said piston;
    a solenoid-operated driving mechanism for driving said damping force control mechanism; and
    a casing for accommodating said solenoid-operated driving mechanism;
    wherein said solenoid-operated driving mechanism includes:
        a coil provided in said casing;
        a tubular member provided in said coil at a first end portion of said coil to form a portion of a magnetic path for the magnetic flux created when said coil is energized, said tubular member having a bottom wall;
        a plunger slidably guided in said tubular member so that a space filled with the hydraulic fluid is defined between said plunger and said bottom wall of said tubular member, said plunger having a passage axially extending therethrough, and said passage having an orifice; and
        an attracting member provided in said coil at a second end portion of said coil opposite said first end to form another portion of the magnetic path when said coil is energized so as to attract said plunger,
        said plunger having a small-diameter main body portion slidably guided in said tubular member, and having a large-diameter attracted portion located within said coil and between said small-diameter main body portion and said attracting member with respect to a longitudinal axis of said tubular member, and said large-diameter attracted portion having a surface facing said attracting member, and
        said attracting member having a tubular projection provided on a surface thereof that faces said attracted portion of said plunger so that said attracted portion enters or withdraws from said tubular projection.

2. A damping force control type hydraulic shock absorber according to claim 1, wherein said plunger has a tapered portion so as to gradually increase in diameter from said main body portion toward said attracted portion.

3. A damping force control type hydraulic shock absorber according to claim 1, said piston being connected to said piston rod through a piston bolt, said piston bolt having a cylindrical portion extending through said piston and said piston bolt having a larger-diameter portion, said casing being connected to both said piston bolt and said piston rod.

4. A damping force control type hydraulic shock absorber according to claim 3, wherein said damping force control mechanism comprises said cylindrical piston bolt portion having an axial bore therein to define a side wall and a slider slidably received in said axial bore,
    said side wall of the piston bolt portion having an extension side upstream port, an extension side downstream port, a compression side upstream port, and a compression side downstream port, and
    said slider including an extension valve member and a compression valve member, each of which controls flow of the hydraulic fluid between said upstream and downstream ports by the movement of said slider,
    wherein the shock absorber further comprises an actuating rod connecting said plunger to said slider and a spring which biases said actuating rod in a direction opposite to that of the attraction force working between said plunger and said attracting member.

5. A damping force control type hydraulic shock absorber according to claim 4, further comprising an extension side pilot operated type damping valve and a compression side pilot operated type damping valve, each damping valve being disposed in said hydraulic fluid passage on the respective upstream side of the associated upstream port of the piston bolt portion and including a disk valve which opens depending on the pressure of the hydraulic fluid applied thereto thereby generating a damping force and including a pilot chamber formed on the respective downstream side of said disk valve and communicating with said upstream port.

6. A damping force control type hydraulic shock absorber according to claim 1, further comprising:
    a first bearing situated in said tubular member so that said plunger is slidably guided by the first bearing; and
    a second bearing situated in said attracting member,
    wherein said solenoid-operated driving mechanism includes an actuating rod having opposite end portions, a first end portion of the actuating rod being connected to an end portion of the plunger on the side of said attracting member, and a second end portion of said actuating rod extending through said attracting member and slidably guided by said second bearing.

7. A solenoid-operated driving apparatus comprising:
    a coil provided in a casing;
    a tubular member provided in said coil at a first end portion of said coil to form a portion of a magnetic path for the magnetic flux created when said coil is energized, said tubular member having a bottom wall;
    a plunger slidably guided in said tubular member so that a space filled with a hydraulic fluid is defined between said plunger and said bottom wall of said tubular member, said plunger having a passage axially extending therethrough, and said passage having an orifice; and
    an attracting member provided in said coil at a second end portion of said coil opposite said first end portion to form another portion of the magnetic path when said coil is energized so as to attract said plunger,
    said plunger having a small-diameter main body portion slidably guided in said tubular member, and having a large-diameter attracted portion located within said coil and between said small-diameter main body portion and said attracting member with respect to a longitudinal axis of said tubular member, and said large-diameter attracted portion having a surface facing said attracting member, and said attracting member having a tubular projection provided on a surface thereof that faces said attracted portion of said plunger so that said attracted portion enters or withdraws from said tubular projection.

8. A solenoid-operated driving apparatus according to claim 7, further comprising:
a first bearing situated in said tubular member so that said plunger is slidably guided by the first bearing; and
a second bearing situated in said attracting member, wherein said solenoid-operated driving apparatus further includes an actuating rod having opposite end portions, a first end portion of the actuating rod being connected to an end portion of the plunger on the side of said attracting member, and a second end portion of said actuating rod extending through said attracting member and slidably guided by said second bearing.

9. A damping force control type hydraulic shock absorber according to claim 2, said piston being connected to said piston rod through a piston bolt, said piston bolt having a cylindrical portion extending through said piston and said piston bolt having a larger-diameter portion, said casing being connected to both said piston bolt and said piston rod.

10. A damping force control type hydraulic shock absorber according to claim 1, wherein said attracted portion has an attracted surface facing said attracting member, and said attracting member has an attracting surface facing said attracted surface of said attracted portion, said attracted surface and said attracting surface being substantially parallel and axially aligned with respect to a longitudinal axis of said coil.

11. A damping force control type hydraulic shock absorber according to claim 7, wherein said attracted portion has an attracted surface facing said attracting member, and said attracting member has an attracting surface facing said attracted surface of said attracted portion, said attracted surface and said attracting surface being substantially parallel and axially aligned with respect to a longitudinal axis of said coil.

12. A damping force control type hydraulic shock absorber comprising:
a cylinder having a hydraulic fluid sealed therein;
a piston slidably provided in said cylinder to divide an inside of said cylinder into an upper chamber and a lower chamber;
a piston rod connected to said piston by a piston bolt having a cylindrical portion extending through said piston;
a hydraulic fluid passage for providing communication between said upper chamber and said lower chamber;
a damping force control mechanism provided in said hydraulic fluid passage to control damping force by controlling flow of the hydraulic fluid induced in said hydraulic fluid passage by sliding movement of said piston, said damping force control mechanism comprising:
said cylindrical portion of said piston bolt having an axial bore therein to define a side wall; and
a slider slidably received in said axial bore,
said side wall of said cylindrical portion having an extension side upstream port, an extension side downstream port, a compression side upstream port, and a compression side downstream port, and
said slider including an extension valve member and a compression valve member, each of which controls flow of the hydraulic fluid between said upstream and downstream ports by the movement of said slider,
an actuating rod connecting a plunger to said slider of damping force control mechanism;
a spring for biasing said actuating rod;
a solenoid-operated driving mechanism for driving said damping force control mechanism; and
a casing for accommodating said solenoid-operated driving mechanism;
wherein said solenoid-operated driving mechanism includes:
a coil provided in said casing;
a tubular member provided in said coil at a first end portion of said coil to form a portion of a magnetic path for the magnetic flux created when said coil is energized, said tubular member having a bottom wall;
said plunger slidably guided in said tubular member so that a space filled with the hydraulic fluid is defined between said plunger and said bottom wall of said tubular member, said plunger having a passage axially extending therethrough, and said passage having an orifice; and
an attracting member provided in said coil at a second end portion of said coil opposite said first end to form another portion of the magnetic path when said coil is energized so as to attract said plunger,
said plunger having a small-diameter main body portion slidably guided in said tubular member, and having a large-diameter attracted portion located within said coil and between said small-diameter main body portion and said attracting member with respect to a longitudinal axis of said tubular member, and said large-diameter attracted portion having a surface facing said attracting member,
said attracting member having a tubular projection provided on a surface thereof that faces said attracted portion of said plunger so that said attracted portion enters or withdraws from said tubular projection, and
said spring biases said actuating rod in a direction opposite to that of the attraction force between said plunger and said attracting member.

13. A damping force control type hydraulic shock absorber according to claim 12, said piston bolt has a portion having a larger diameter than said cylindrical portion, said casing being connected to both said piston bolt and said piston rod.

14. A damping force control type hydraulic shock absorber according to claim 13, further comprising an extension side pilot operated type damping valve and a compression side pilot operated type damping valve, each damping valve being disposed in said hydraulic fluid passage on the respective upstream side of the associated upstream port of the piston bolt portion and including a disk valve which opens depending on the pressure of the hydraulic fluid applied thereto thereby generating a damping force and including a pilot chamber formed on the respective downstream side of said disk valve and communicating with said upstream port.

15. A damping force control type hydraulic shock absorber according to claim 12, wherein said attracted portion has an attracted surface facing said attracting member, and said attracting member has an attracting surface facing said attracted surface of said attracted portion, said attracted surface and said attracting surface being substantially parallel and axially aligned with respect to a longitudinal axis of said coil.

* * * * *